United States Patent [19]

Steiger

[11] 4,086,883
[45] May 2, 1978

[54] RECIPROCATING INTERNAL-COMBUSTION ENGINE CHARGED WITH FUEL IN POWDER FORM

[75] Inventor: Anton Steiger, Illnau, Switzerland

[73] Assignee: Sulzer Brothers Ltd., Winterthur, Switzerland

[21] Appl. No.: 714,811

[22] Filed: Aug. 16, 1976

[30] Foreign Application Priority Data

Mar. 5, 1976 Switzerland ............... 2754/76

[51] Int. Cl.² ............ F02B 45/00; F02D 19/04
[52] U.S. Cl. ......................... 123/23; 222/368
[58] Field of Search ............ 123/23, 188 A, 188 VA; 110/28 R; 60/39.46; 222/285, 315, 317, 368

[56] References Cited

U.S. PATENT DOCUMENTS

| | | | |
|---|---|---|---|
| 1,229,172 | 6/1917 | Tygard ................... | 123/23 |
| 1,897,478 | 2/1933 | Holzwarth ............... | 123/23 |
| 2,988,080 | 6/1961 | Rankl .................. | 123/188 VA |
| 3,910,428 | 10/1975 | Peterson ................ | 222/368 |
| 3,911,875 | 10/1975 | Ysberg ................. | 122/188 A |

FOREIGN PATENT DOCUMENTS

| | | | |
|---|---|---|---|
| 100,632 | 4/1937 | Australia ............... | 123/23 |
| 603,020 | 8/1930 | Germany ............... | 123/23 |
| 450,727 | 7/1935 | United Kingdom ......... | 123/23 |
| 809,844 | 3/1959 | United Kingdom ......... | 60/39.46 |

Primary Examiner—Charles J. Myhre
Assistant Examiner—David D. Reynolds
Attorney, Agent, or Firm—Kenyon & Kenyon, Reilly, Carr & Chapin

[57] ABSTRACT

The powdered fuel is dosed in metered amounts by a pocketed dosing wheel into a fuel-feeding duct which is opened and closed by reciprocally mounted slider. Air is charged into the fuel feeding duct via a compressed air duct above the fuel valve. Upon opening of the fuel valve, a blast of air is charged via a control valve into the compressed air duct to expel the powdered fuel in the fuel-receiving chambers of the fuel valve.

11 Claims, 7 Drawing Figures

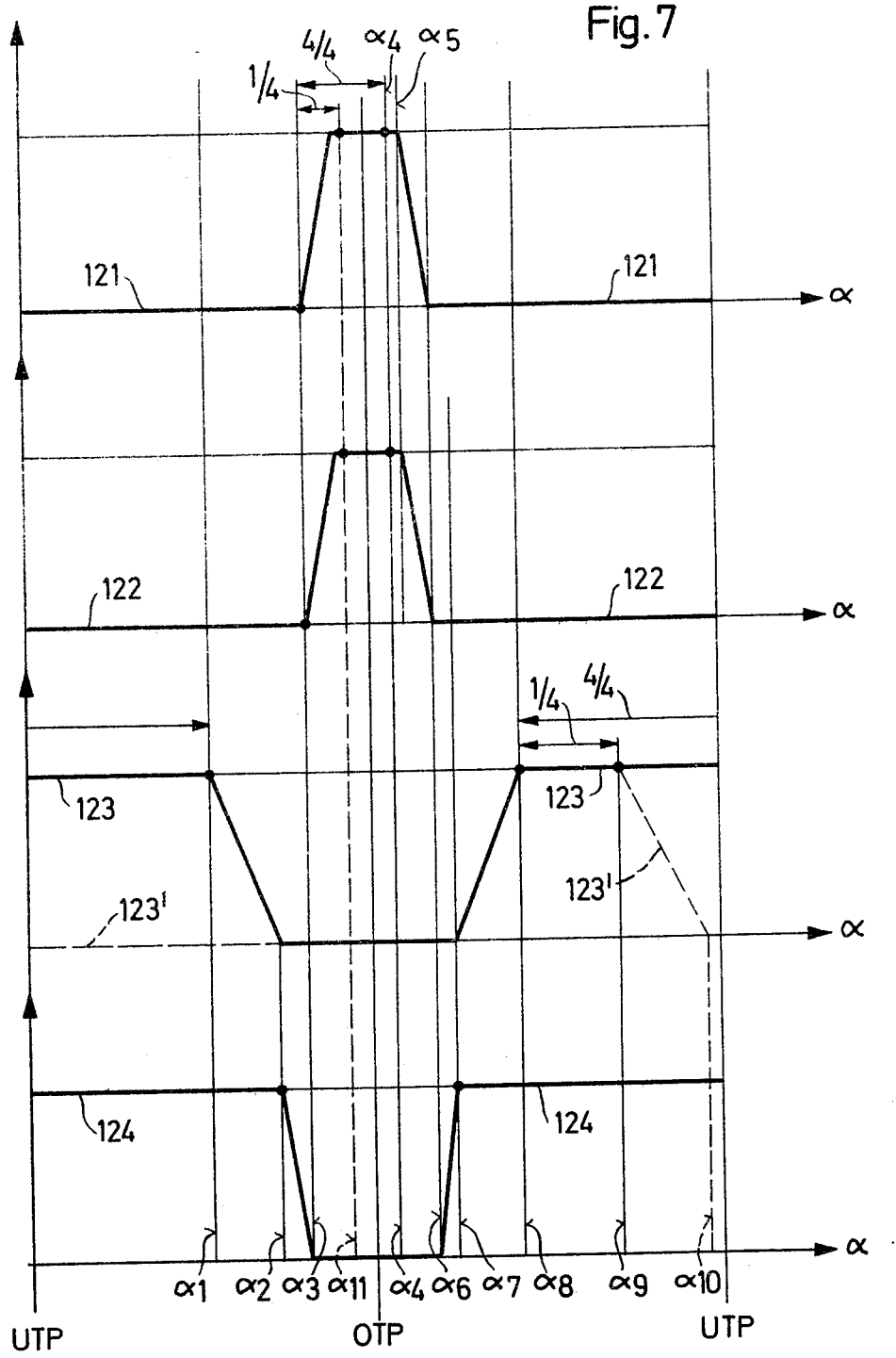

RECIPROCATING INTERNAL-COMBUSTION ENGINE CHARGED WITH FUEL IN POWDER FORM

This invention relates to a reciprocating internal-combustion engine charged with fuel in powder form.

Heretofore, it has been known to deliver a fuel suspension formed from powdered coal and air, for example, via two coaxially arranged valves, to an antechamber of a combustion chamber of an internal combustion engine in which the mixture is ignited and burned with the aid of oil. However, it is usually not advantageous to suspend the powdered coal in air for feeding to the combustion chamber as a uniform distribution of the powder during flow from the place where the suspension is formed to the antechamber cannot be assured. Therefore, since an apportioning of a defined quantity of powdered coal cannot be obtained during operation, the engine is usually charged to a different degree and, thus, has a different power output for each operating cycle. Further, the use of valves, which may be preferred under some conditions, is also disadvantageous in these engines. This is due to the fact that tight closing of the valve seating surfaces is not attainable over extended periods of time. This is because dust particles unavoidably settle on the seating surfaces of the valves. Still further, special devices and added energy must be provided in order to form the suspension which must be brought up to the compression pressure. This increases the costs of the installation and the operation substantially.

Accordingly, it is an object of the invention to improve an internal-combustion engine of the above type in such a manner that, with little extra cost for equipment and operation, the power delivered per working cycle becomes more uniform.

It is another object of the invention to make valve control of a powdered fuel supply to an internal combustion engine possible without dust particles settling on the valve seating surfaces.

Briefly, the invention is directed to a reciprocating internal combustion engine having a cylinder head and a combustion chamber. In accordance with the invention, the engine is provided with a fuel-feeding duct, a fuel valve, a fuel dosing means, a compressed air duct, a control valve for controlling a flow of air to the compressed air duct, a closure means in said fuel-feeding duct and control means.

The fuel-feeding duct is disposed in an insert located within the cylinder head and has a valve seat adjacent the combustion chamber. The air duct is also disposed in the insert and communicates with the fuel-feeding duct at a juncture point spaced from the valve seat.

The fuel valve has a valve body for selectively seating on the valve seat in order to close the fuel-feeding duct.

The dosing means serves to deliver charges of fuel to the fuel-feeding duct while the closure means is located between the dosing means and the juncture point for closing the fuel-feeding duct to the dosing means.

The control means is connected to the fuel valve, air control valve and closure means in order to maintain the two valves in an open position with the closure means closing off the fuel-feeding duct so as to allow a complete injection of fuel from the fuel-feeding duct into the combustion chamber.

With the above construction, the fuel is supplied to the combustion chamber without formation of a suspension of fuel in air or another gaseous transport medium. Instead, the compressed air which is introduced under controlled conditions serves for the ejection of the fuel from the feeding duct. Thus, the amount of compressed air required is only a fraction of the amount required for forming a suspension. The described interaction of the control means, the fuel valve, the compressed-air control valve and the closure means results in a blowing-out of the open fuel valve after the fuel is ejected. This blowing-out results in a cleaning of the working surfaces of the valve seat and the valve body after each cyclically controlled ejection of fuel to ensure tight closing of the fuel valve over extended periods of time.

It is advantageous if the valve body of the fuel valve has chambers on the side facing away from the combustion space, which are formed by radial ribs and a peripheral cover and which open, with the valve open, into the combustion chamber to form fuel receiving chambers in communication with the feeding duct. This allows a uniform distribution of the fuel in the combustion chamber. These chambers may advantageously be formed so that the maximum fuel level is within the system of chambers. As such, the individual chambers prevent undesired turbulence of the fuel during the ejection process.

The closure means can advantageously use a slider which is able to slide across the fuel-feeding duct. The fuel dosing means includes a rotatable cell wheel having a plurality of individual peripheral pockets or cells at the circumference of the wheel. This wheel can be driven and can be fed with fuel under pressure while in a dosing and feeding position, as the wheel turns, the fuel emerges into a duct aligned tangentially to the wheel, while in a wheel position which is axially shifted relative to the dosing and feeding position, the filling of the pockets and the discharge of fuel from the pockets is blocked.

The fuel valve may be controlled in the conventional manner, e.g. by means of a cam shaft. The compressed air, which is fed in for ejecting the fuel can, however, also be utilized for an indirect control of the fuel valve. In this connection, the fuel valve can advantageously move under the influence of the compressed air fed into the feeding duct to a position abutting a stop against the force of a closing spring and against the pressure in the combustion chamber.

The feeding duct and the compressed-air duct may advantageously make an acute angle of less than 60° with each other. This can counteract the undesired rising of fuel dust into the compressed-air duct. In the case of a reciprocating internal-combustion engine with slot control for two-cycle operation, it is also advisable to make the feeding duct curved in such a manner that a non-uniform filling results with a fuel level surface inclined to the axis of the cylinder in the direction of the flushing flow.

The fuel dosing means can advantageously be preceded by a fuel accumulator which may have a spring-loaded piston to discharge the fuel into the cell wheel. In order to prevent ignition failures, the valve body of the fuel valve is advantageously provided with a cooling chamber through which coolant flows.

These and other objects and advantages of the invention will become more apparent from the following detailed description and appended claims taken in conjunction with the accompanying drawings in which:

FIG. 7 illustrates control diagrams for the fuel valve, the compressed-air control valve, the closure means as well as the fuel dosing means in accordance with the invention.

Figure 1:
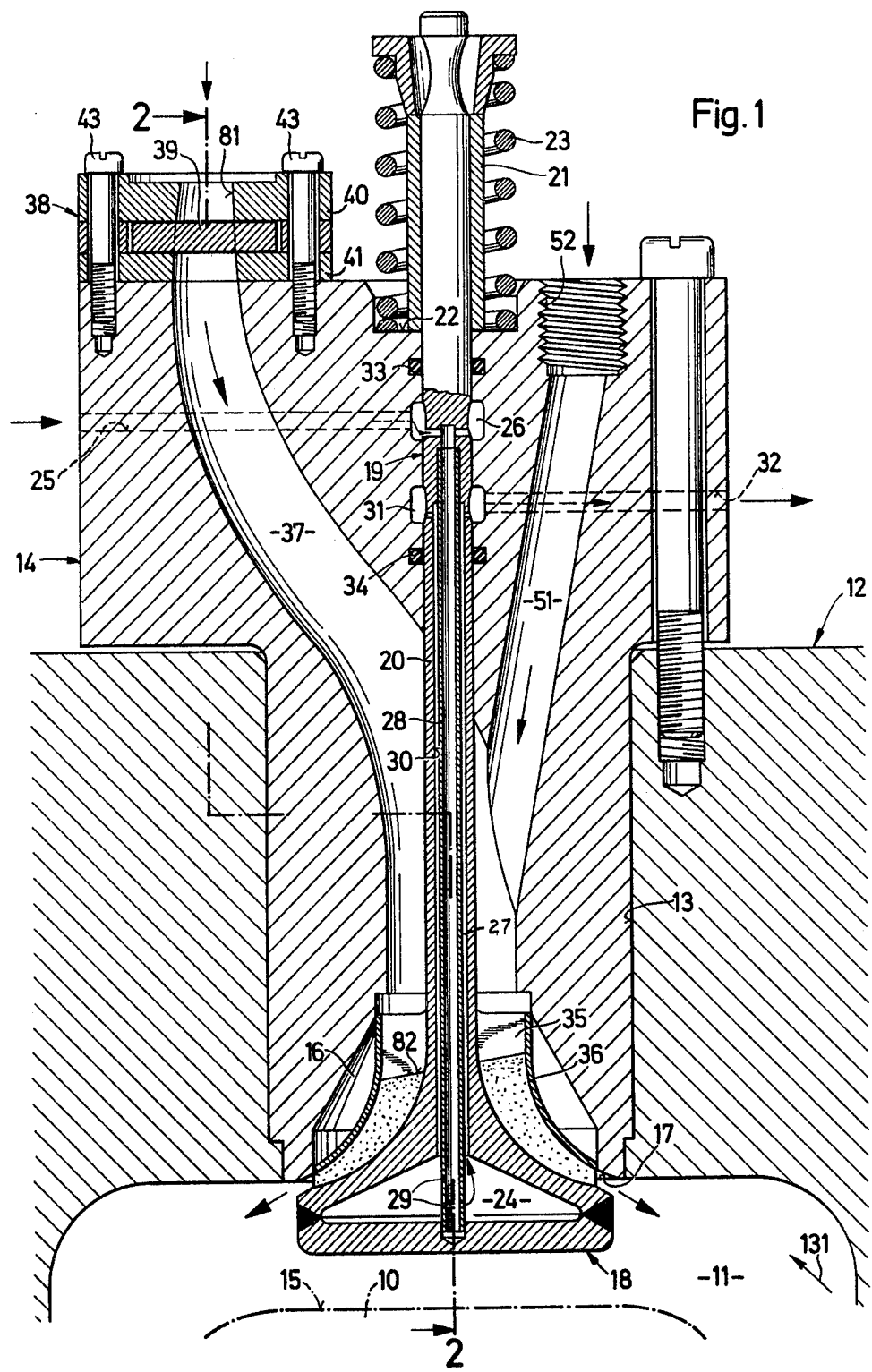
FIG. 1 illustrates an axial cross-sectional view of a cylinder head of a reciprocating internal-combustion engine according to the invention.

Referring to FIG. 1, the reciprocating internal combustion engine has a combustion chamber 11 defined by a cylinder head 12, which is provided with a cylindrical bore 13 for an insert or housing 14. The upper dead center position of the piston of the engine is indicated by the dash-dotted line 15. The insert 14 has a recess 16 at the combustion chamber end which is formed with a valve seat 17 at the lower end.

Figure 2:
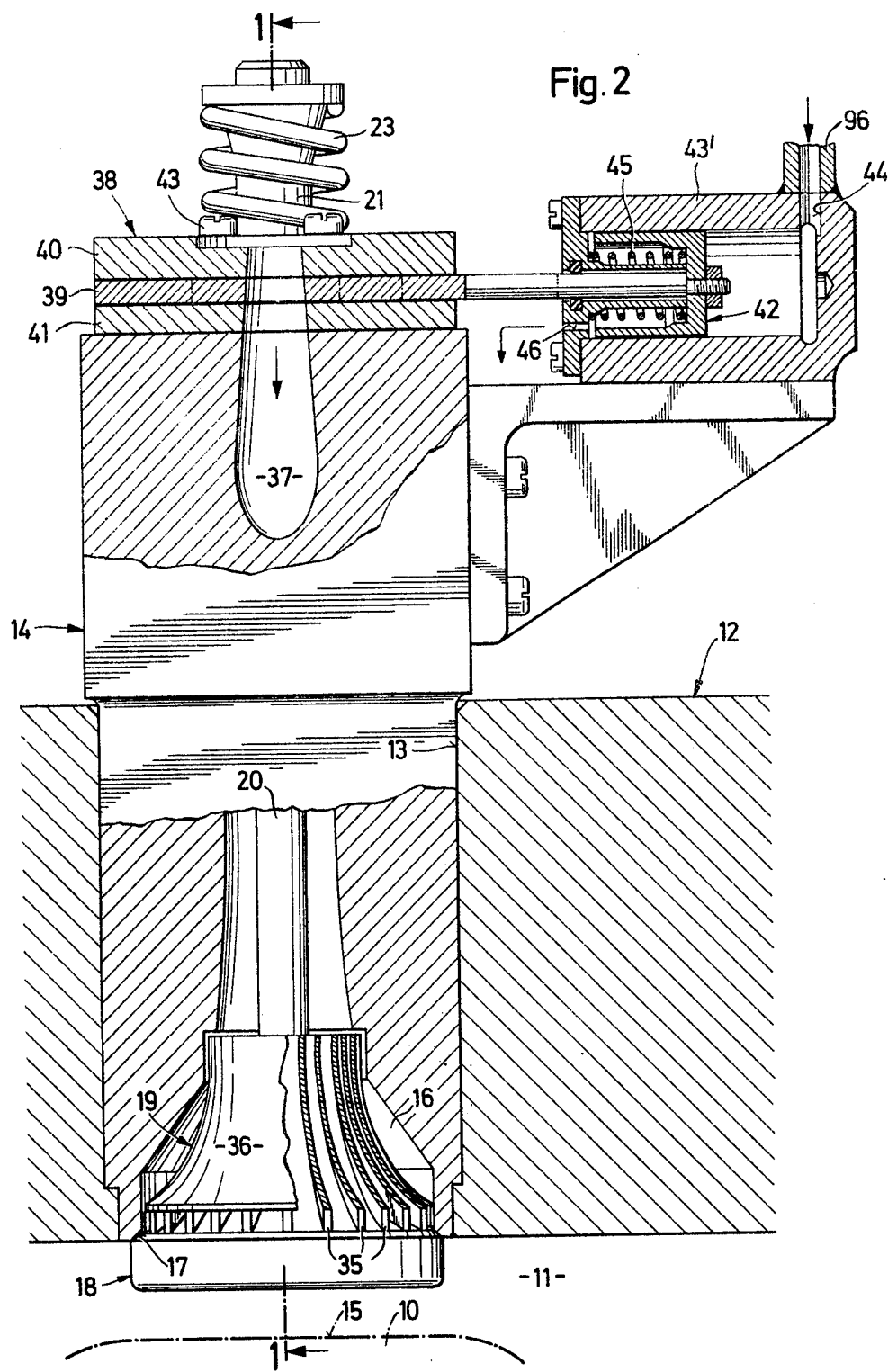
FIG. 2 illustrates a partial view taken on line 1—1 of FIG. 1.

A fuel valve 19 is disposed within the insert 14 and includes a valve body 18 which sealingly seats against the valve seat 17 and is located at the end of a valve stem 20. The upper end of the valve stem 20 carries a flanged collar as well as a loose bushing 21 which rests against a recessed surface 22 in the upper surface of the insert 14 in the open position of the valve. A compression spring 23 is located between the flanged collar and the recess 22 about the sleeve 21 and biases the valve 19 into the closed position as shown in FIG. 2. The valve body 18 has an internal chamber 24, through which a coolant, e.g. cooling oil, flows. To this end, a bore 25 is formed in the insert 14 and leads into an annular space 26 about the stem 20 to supply coolant via radial bores into the interior of the stem 20 and a tube 28 inserted into the stem 20. Suitable openings 29 communicate the lower end of the tube 28 with the coolant chamber 24. The coolant discharges through an annular space 27 formed between the tube 28 and the stem 20 and passes via radial bores into a collecting chamber 31 about the stem 20 and thence through a bore 32 in the insert 14. Suitable O-rings 33, 34 prevent leakage of the coolant from the respective chambers 26, 31 along the stem 20.

The valve body 18 of the fuel valve 19 carries a plurality of fuel-receiving chambers on the side facing away from the combustion space which are formed by radial ribs 35 and a peripheral cover 36. These chambers terminate in the combustion chamber 11 when the valve is open and form a subdivision of a duct 37 which serves for feeding in fuel, such as powdered coal, to the valve while the recess 16 forms a continuation of the fuel-feeding duct 37.

A closure means 38 is located in the fuel-feeding duct 37 to selectively close off the duct 37 to the supply of fuel. This closure means 38 has an apertured slider 39 which, as shown in FIG. 2, can be moved between two plates 40, 41 by means of a hydraulically actuated piston 42. The closure means 38 is fastened to the insert 14 by means of screws 43 while the piston moves in the cylinder 43' mounted on a bracket secured to the insert 14. The piston 42 and cylinder 43' form a motor which operates in a single-action manner. For this purpose, pressurized oil is fed into the cylinder 43' via a connecting port 44 in order to move the piston 42 against the force of a spring 45 into the end position shown. In this position, the slider 39 occupies an open position relative to the fuel-feeding duct 37. Leakage oil can run off via a bleed hole 46. The closed position of the slider 39 is indicated by dash-dotted lines in FIG. 2.

Referring to FIG. 1, a compressed-air duct 51 opens into the fuel feeding duct 37 at an angle of about 30° within the insert 14. A tapped hole 52 is provided in the insert 14 for connection of a compressed air line.

Figure 4:
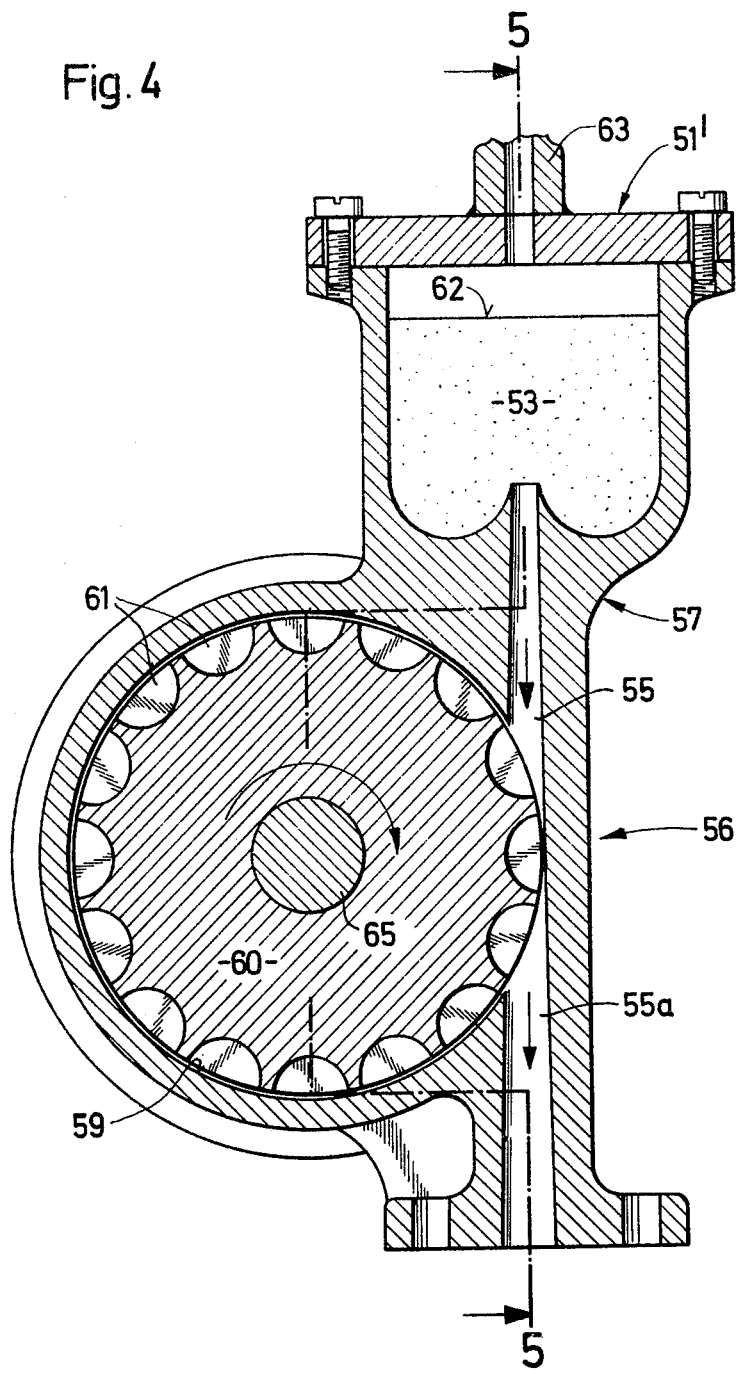
FIG. 4 illustrates a cross-sectional view through a cell wheel dosing means according to the invention.
Figure 5:
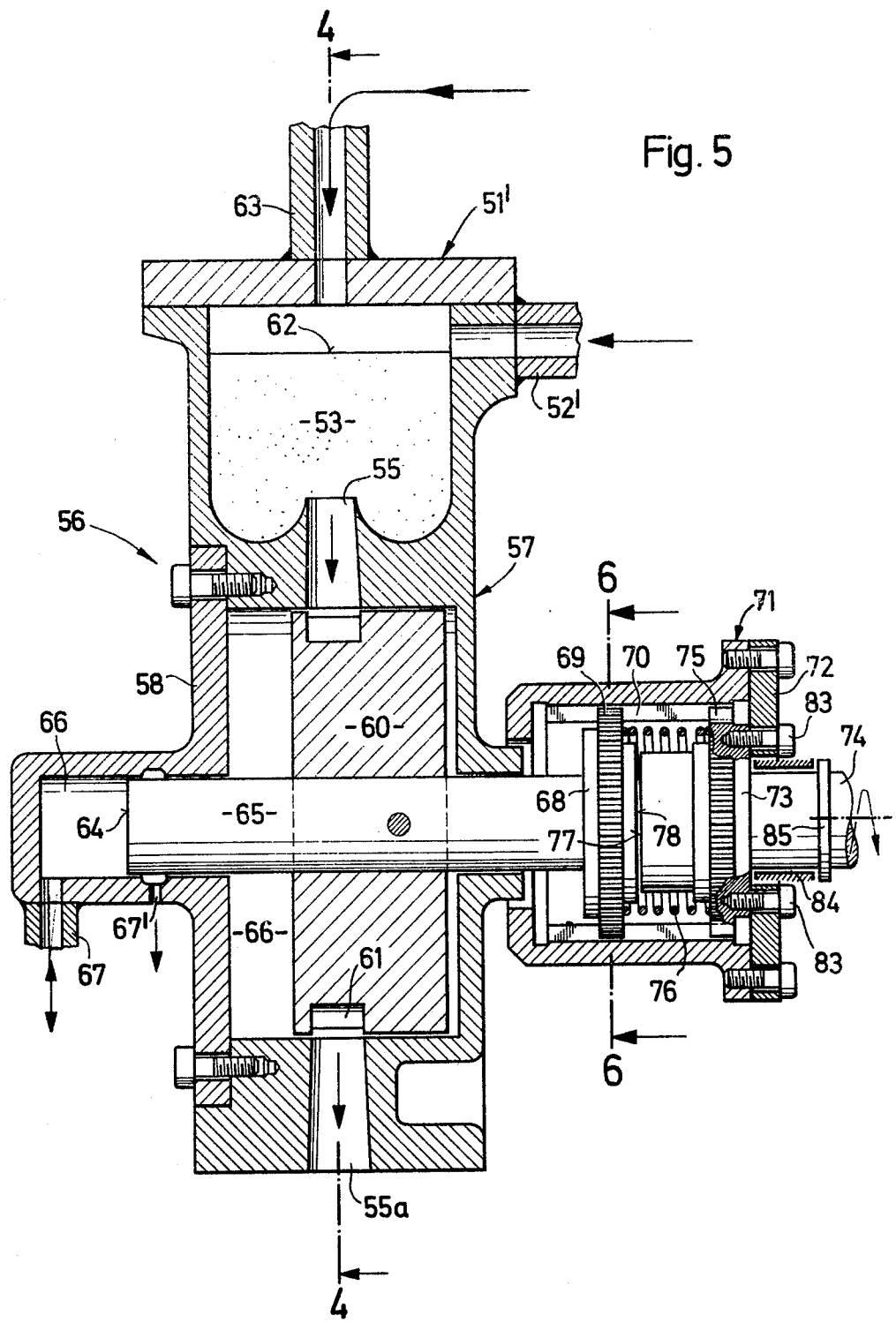
FIG. 5 illustrates a view taken on line 5—5 of FIG. 4.

Referring to FIGS. 4 and 5, a fuel dosing means is provided to deliver charges of fuel, i.e. powdered coal to the fuel-feeding duct 19 (not shown) in the insert 14. This dosing means includes a fuel accumulator 51' to which fuel in powder form is fed continuously via a line 52, for instance, by means of a conveyor worm (not shown). The fuel accumulator 51 has a storage chamber 53 in which the fuel accumulates under the pressure of a spring-loaded piston 54. The storage chamber 53 is, in turn, connected via a duct 55 to a cell-wheel device 56.

Figure 6:
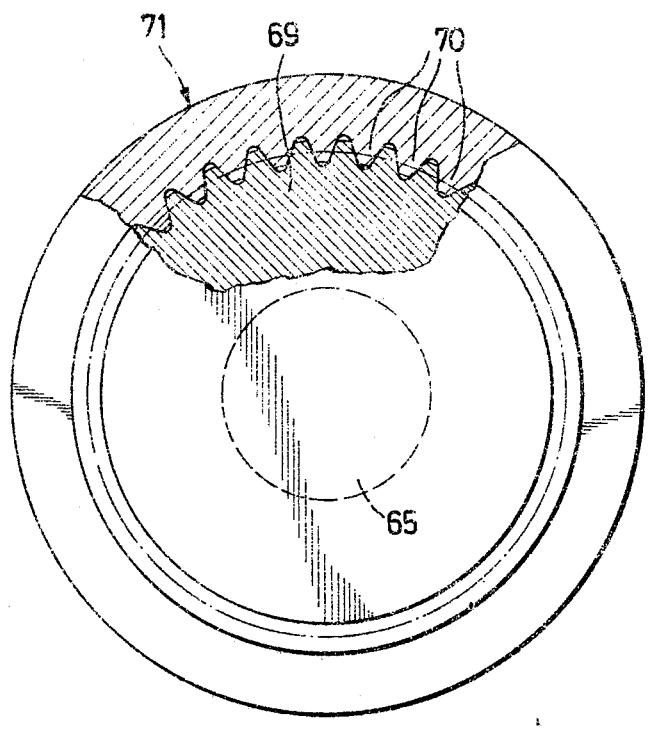
FIG. 6 illustrates a view taken on line 6—6 of FIG. 5.

Referring to. FIGS. 4, 5 and 6, the cell wheel device 56 includes a housing 57 provided with a cover 58 which defines a cylindrical cavity 59 in which a rotatable cell wheel 60 is enclosed. The cell wheel 60 has peripheral pockets 61 for receiving fuel which pockets 61 are aligned, in the dosing position of the cell wheel 60 shown in FIGS. 4 and 5, toward the feeding duct 55 and also toward an outlet duct 55a disposed tangentially of the cell wheel 60. The housing 57 is constructed integrally with the housing of the fuel accumulator 51'. In contrast to FIG. 3, the fuel which is filled up to a level 62 in the storage chamber 53 is not loaded mechanically but is under the pressure of a pneumatic pressure medium. To this end, a pressure medium connection 63 is provided in the top of the accumulator housing.

Figure 3:
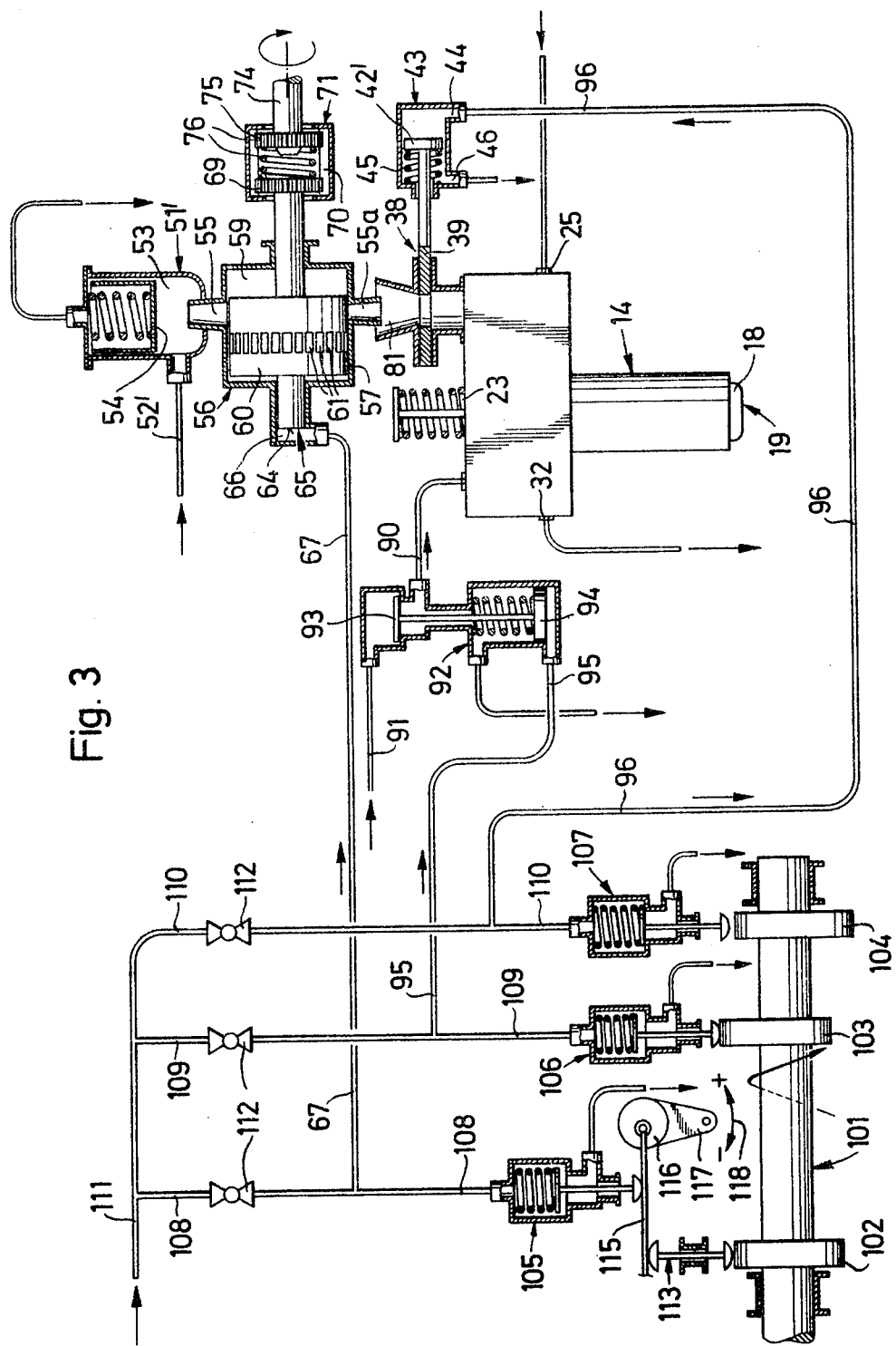
FIG. 3 illustrates a schematic of the engine of FIG. 1 according to the invention.

The cell wheel 60 is mounted to be moved axially from the dosing position shown in FIGS. 4 and 5 into a blocked positioned, which is illustrated in FIG. 3. For this purpose, one end 64 of the cell wheel shaft 65 is constructed as a piston, which can be moved in a cylinder space 66 formed by the housing cover 58. Pressurized oil can be fed to or discharged from the cylinder space 66 via a line 67 while a port 67' serves for the removal of leakage oil. The other end of the cell wheel shaft 65 carries a flange 68 as well as a gear 69 which meshes with teeth 70 which are carried on a coupling housing 71. A cover 72 of the coupling housing 71 is firmly connected by means of screws 83 to a flange 73 on the end of a drive shaft 74 which rotates at a multiple of the speed of the internal combustion engine. The flange 73 also carries a corresponding gear 75 which meshes with the teeth 70. A compression spring 76 is disposed between the end faces of the gears 69, 75 facing each other. This arrangement allows the cell wheel 60 to be shifted without interruption of its rotation or that of the drive shaft 74.

In the dosing position, as shown in FIG. 5, the end face 77 at the end of the cell wheel shaft 65 is biased towards the end face 78 of the drive shaft 74 while compressing the spring 76. In the blocked position of the cell wheel 60, the shoulder 68 rests against the inside wall of the coupling housing 71. The drive shaft 74 is axially fixed by means of bushings 84 which simultaneously act as axial bearings and by the shaft collars 73, 85.

Referring to FIG. 3, the outlet duct 55a of the cell wheel device 56 is aligned with an inlet duct 81 of the closure means 38 in such a manner that, with the cell wheel 60 in the dosing position, fuel is thrown through the outlet duct 55a into the feeding duct 37 (FIG. 1). This fuel is connected in the chambers formed by the ribs 35 and the cover 36 and, specifically, if the fuel valve 19 is closed, up to the level 82 which corresponds to the respective fuel charge for a working cycle of the internal combustion engine.

Referring to FIG. 3, wherein like reference characters indicate like parts as above, a control valve 92 is provided to control the flow of compressed air to the duct 51 (not shown) while a control means is provided to control the operation of the valves 19, 92, dosing means 56 and closure means 38. As shown, the compressed-air connection hole 52 is connected to the line 90 (FIG. 3). The compressed air is supplied from a source (not shown) via the line 91 to the compressed-air control valve 92 which consists of a valve body 93 controlled via a spring loaded piston 94 to admit a flow of compressed air into the line 91. In order to control the motion of the piston 94, the valve 92 is connected to a pressurized oil line 95. A further pressurized-oil line 96 is connected to the port 44 of the positioning cylinder 43 for the slider 39.

The control means includes a control shaft 101 which rotates at the engine speed. The shaft 101 carries cams 102, 103 and 104, which operate, in a manner known per se, control valve 105, 106 and 107 via tappets. The valves 105, 106 and 107 are connected via lines 108, 109, 110 to the line 111, which communicates with the pressurized oil source (not shown). The pressure switched by the control valve 105 to the line 108 is utilized via the line 67 for controlling the position of the cell wheel 60. The pressure in the line 109 acts via the line 95 on the piston 94 of the compressed-air control valve 92. Finally, the pressure present in the line 110 controls via the line 96 the piston 42 for the closure slider 39. When the valves 105, 106, 107 are open, pressurized oil can escpae, so that the pressure in the respective control lines falls under the action of throttle choke valves 112. With a valve 105, 106, 107 closed, the oil pressure builds up and effects a corresponding control of the connected hydraulic positioning means 60, 92, 39.

The tappet 113 operated by the cam 102 acts on a lever 115, one end of which is linked eccentrically to a disk 116. Rotation of the disk by means of a lever 117 in the plus-direction of the arrow 118 superimposes an additional movement on the displacement of the control piston of the valve 105 caused by the tappet 113, in the closing direction. Thus, the timing during which an effective control pressure for transferring the cell wheel 60 into the dosing position is present in the lines 108 and 67 becomes lengthened. Conversely, swinging the lever 117 in the minus-direction of the arrow 118 causes this time interval to be shortened.

Referring to FIG. 7, curve 121 illustrates the stroke of the fuel valve 19 during the motion of the piston 15 of the internal-combustion engine during a full revolution of the crank shaft (not shown). The lift of the fuel valve is plotted as the ordinate, while the crank angle is plotted as the abscissa, with the positions of the lower dead center UTP and the upper dead center OTP. Curve 122 shows the corresponding lifting diagram for the compressed air valve 62; curve 123 for the displacement of the cell wheel 60 and curve 124 for the displacement of the slider 39. All the curve trains move between a lower level, at which the respective valve or the slider is in the closed position or the cell wheel occupies a position in the blocking position.

At the lower dead center of the piston 15, the fuel valve 19 and the compressed-air valve 92 are in the closed position; the cell wheel 60 occupies the dosing position and the slider 39 is open. In this operating condition, fuel is transported into the feeding duct 37, which finally fills the chambers formed by the ribs 35 and the slider 36 up to the level 82. At an operating point characterized by the crank angle $\alpha_1$, the control valve 105 is opened. Thus, pressurized oil can flow out of the control valve 105 and the pressure in the line 67 drops low enough so that the cell wheel 60 moves into the blocked position under the influence of the spring 76.

At the crank angle $\alpha_2$, the closing movement of the slider 39 begins and is completed at the crank angle $\alpha_3$. At that point, the cam brings about a closing movement of the control valve 106. This causes the pressure in the line 95 to rise and thereby, the compressed-air control valve 92 to open. Compressed air is then fed to the compressed-air duct 51, while the slider 39 is closed. The pressure increases above the fuel level 82. This pressure increase causes the fuel valve 19 to open according to the shape of the curve 121 against the force of the spring 23 and the compression pressure in the combustion chamber. When the valve body 18 is moved from the seating surface 17, the path is freed for the ejection of the powdered fuel into the combustion chamber above the piston 15. This ejection lasts until the crank angle $\alpha_4$ is assumed. As the compressed-air valve 92 initiates a closing movement only when the crank angle $\alpha_5$ is reached, the fuel receiving chambers of the valve body 18, the valve body 18 and the seating surface 17 are blown clear during a time interval extending between the crank angles $\alpha_4$ and $\alpha_5$. In this manner, fuel residue is prevented from sticking on the cooperating sealing surfaces. Thus, a tight closing of the fuel valve is possible and, in addition, wear is reduced. When the crank angle $\alpha_6$ is reached, however, the compressed-air valve 92 is closed along with the fuel valve 18. At the same time, the slider 39 begins an opening movement, caused by a closing motion of the control valve 107.

At the crank angle $\alpha_7$, the slider 39 is completely closed. An expansion phase for the compressed air captured in the duct 51 and the duct 37 thus occurs between the crank angles $\alpha_6$ and $\alpha_7$.

When the crank angle $\alpha_8$ is reached, the cell wheel 60 is in the dosing position and, with the slider 39 open, again transports fuel into the duct 37, and more specifically, beyond the lower dead center of the crank shaft up to a position of the crank shaft corresponding to the crank angle $\alpha_1$ in the next working cycle.

The described fuel injection time according to the time interval extending between the crank angles $\alpha_3$ and $\alpha_4$ corresponds to a maximum fuel charge for full load. If the lever arm 117 is moved in the minus-direction of the arrow 118, then the time is shortened during which the cell wheel 60 transports fuel into the feeding duct 37. The dashed line 123' illustrates an advanced displacement of the cell wheel 60 at the crank angle $\alpha_9$ in the blocked position as compared to full-load operation; the shut-off position is reached at the crank angle $\alpha_{10}$. This fuel charge corresponds, for instance, to ¼ load.

With the reduced amount of fuel, the ejection of fuel into the combustion chamber is already completed at a time defined by the crank angle $\alpha_{11}$.

The fuel, which is finely distributed due to the form of the fuel chambers at the valve body 18, is ignited by means of a suitable ignition aid. As an ignition aid, ignition oil can be introduced, for instance, into the combustion chamber by means of an injection valve. It would also be possible to use a spark plug or an incandescent element.

The fuel level 82 which adjusts itself in the chambers formed by the ribs 35 is inclined due to the curvature of the fuel feeding duct 37. Thus, if the internal combustion engine is constructed for slot-controlled two-cycle operation, the chambers are arranged so that the air flow is in the direction of the arrow 131. Therefore, even though the inclined position of the fuel level 83 causes an uneven fuel distribution in the combustion chamber 11, undesirable effects on combustion can be effectively avoided by guiding the ejecting air flow as described.

What is claimed is:

1. In a reciprocating internal combustion engine having a cylinder head and a combustion chamber, the combination comprising
    a fuel-feeding duct within said cylinder head and communicating with said combustion chamber, said duct having a valve seat adjacent said combustion chamber;
    a fuel valve having a valve body for selectively seating on said valve seat to close said duct;
    a fuel dosing means for delivering charges of fuel to said duct;
    a compressed air duct communicating with said fuel-feeding duct at a juncture point spaced from said valve seat;
    a control valve for controlling a flow of air to said compressed air duct;
    a closure means between said fuel dosing means and said juncture point for closing said fuel feeding duct to said fuel dosing means; and
    control means connected to said fuel valve, said control valve and said closure means for maintaining said valves in an open position with said closure means closing off said fuel-feeding duct to said dosing means to allow a complete injection of fuel from said fuel-feeding duct into said combustion chamber.

2. The combination as set forth in claim 1 wherein said valve body includes a plurality of ribs and a peripheral cover defining a plurality of fuel-receiving chambers in communication with said fuel-feeding duct.

3. The combination as set forth in claim 2 wherein said fuel-feeding duct is curved to deliver fuel into said chambers to form a charge of fuel having an upper surface inclined to said combustion chamber in the direction of air flow into said combustion chamber.

4. The combination as set forth in claim 1 wherein said closure means includes a slider for sliding across said fuel-feeding duct.

5. The combination as set forth in claim 1 wherein said fuel dosing means includes a rotatable cell wheel having a plurality of circumferentially disposed peripheral pockets, a duct tangentially disposed relative to said wheel to receive fuel charges from said pockets, and means for moving said wheel axially relative to said duct from a dosing position to a blocked position.

6. The combination as set forth in claim 1 which further comprises a stop for limiting movement of said fuel valve into an open position relative to said combustion chamber and a spring biasing said fuel valve into a closed position relative to said combustion chamber and with said valve body seating on said valve seat.

7. The combination as set forth in claim 1 wherein said ducts define an included angle of 60°.

8. The combination as set forth in claim 1 which further comprises a fuel accumulator upstream of said fuel dosing means to receive a supply of fuel.

9. The combination as set forth in claim 8 wherein said accumulator has a spring loaded piston for discharging the fuel towards said dosing means.

10. The combination as set forth in claim 1 wherein said fuel valve includes a chamber for receiving coolant.

11. In a reciprocating internal combustion engine having a cylinder head and a combustion chamber, the combination comprising
    an insert in said cylinder head;
    a fuel-feeding duct within said insert communicating with said combustion chamber, said duct having a valve seat adjacent said combustion chamber;
    a fuel valve in said duct;
    a fuel dosing means for delivering charges of fuel to said duct in said insert above said valve;
    a compressed air duct in said insert communicating with said fuel-feeding duct at a juncture point spaced from said valve;
    a control valve for controlling a flow of air to said compressed air duct;
    a closure means between said fuel dosing means and said juncture point for closing said fuel feeding duct to said fuel dosing means; and
    control means connected to said fuel valve, said control valve and said closure means for maintaining said valve in an open position with said closure means closing off said fuel-feeding duct to said dosing means to allow a complete injection of fuel from said fuel-feeding duct into said combustion chamber.

* * * * *

UNITED STATES PATENT AND TRADEMARK OFFICE
CERTIFICATE OF CORRECTION

PATENT NO. : 4,086,883

DATED : May 2, 1978

INVENTOR(S) : Anton Steiger

It is certified that error appears in the above–identified patent and that said Letters Patent are hereby corrected as shown below:

Column 5, line 3 change " connected " to --collected--

Signed and Sealed this

Fourteenth Day of November 1978

[SEAL]

Attest:

RUTH C. MASON
Attesting Officer

DONALD W. BANNER
Commissioner of Patents and Trademarks